United States Patent
Imamura (10) Patent No.: US 11,853,005 B2
(45) Date of Patent: Dec. 26, 2023

(54) TONER, TONER CARTRIDGE, AND IMAGE FORMING APPARATUS

(71) Applicant: TOSHIBA TEC KABUSHIKI KAISHA, Tokyo (JP)

(72) Inventor: Yosuke Imamura, Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 597 days.

(21) Appl. No.: 17/002,652

(22) Filed: Aug. 25, 2020

(65) Prior Publication Data

US 2022/0066340 A1    Mar. 3, 2022

(51) Int. Cl.

| | |
|---|---|
| G03G 9/087 | (2006.01) |
| C08K 3/36 | (2006.01) |
| C08K 3/22 | (2006.01) |
| G03G 9/113 | (2006.01) |
| G03G 9/08 | (2006.01) |
| B82Y 30/00 | (2011.01) |

(52) U.S. Cl.
CPC .......... *G03G 9/08755* (2013.01); *C08K 3/22* (2013.01); *C08K 3/36* (2013.01); *G03G 9/0819* (2013.01); *G03G 9/1139* (2013.01); *B82Y 30/00* (2013.01); *C08K 2003/2237* (2013.01); *C08K 2201/005* (2013.01)

(58) Field of Classification Search
CPC ............. G03G 9/08755; G03G 9/0819; G03G 9/1139; G03G 9/08782; G03G 9/08795; G03G 9/08797; G03G 9/09708; G03G 9/09725; C08K 3/22; C08K 3/36
See application file for complete search history.

(56) References Cited

U.S. PATENT DOCUMENTS

| | | | |
|---|---|---|---|
| 2003/0224278 A1 | 12/2003 | Shirai et al. | |
| 2017/0102629 A1* | 4/2017 | Moriya | G03G 9/08755 |
| 2017/0160657 A1* | 6/2017 | Suzumura | G03G 9/0812 |
| 2017/0261876 A1 | 9/2017 | Kabata et al. | |
| 2018/0181013 A1 | 6/2018 | Chiba | |

FOREIGN PATENT DOCUMENTS

| | | |
|---|---|---|
| JP | 2012-067043 A | 4/2012 |
| JP | 2019-168529 A | 10/2019 |

* cited by examiner

*Primary Examiner* — Stewart A Fraser
(74) *Attorney, Agent, or Firm* — FOLEY & LARDNER LLP (57) ABSTRACT

A toner includes toner base particles and an external additive. The external additive is adhered to surfaces of the toner base particles, which contain a crystalline polyester resin and an ester wax. The proportion of an ester compound with a carbon number of $C_1$, the content of the ester compound with a carbon number of $C_1$ being highest among the ester compounds constituting the ester wax, is 65 mass % or more with respect to 100 mass % of the ester wax. The carbon number distribution of the ester compounds constituting the ester wax has only one maximum peak in a region where the carbon number is 43 or more. The external additive contains silica particles having a volume average primary particle diameter $D_{50}$ of 40 to 75 nm. The moisture content of the silica particles is less than 1.0 mass % with respect to 100 mass % of the silica particles.

19 Claims, 3 Drawing Sheets

| | CRYSTALLINE POLYESTER RESIN | ESTER WAX | SILICA PARTICLES α | LOW-TEMPERATURE FIXABILITY | STORAGE STABILITY | HEAT RESISTANCE | ELECTRIC CHARGE AMOUNT |
|---|---|---|---|---|---|---|---|
| EXAMPLE 1 | D | A | A | GOOD | GOOD | GOOD | GOOD |
| EXAMPLE 2 | G | B | B | GOOD | GOOD | GOOD | GOOD |
| EXAMPLE 3 | B | C | C | GOOD | GOOD | GOOD | GOOD |
| EXAMPLE 4 | G | D | D | GOOD | GOOD | GOOD | GOOD |
| EXAMPLE 5 | C | E | A | GOOD | GOOD | GOOD | GOOD |
| EXAMPLE 6 | F | F | C | GOOD | GOOD | GOOD | GOOD |
| COMPARATIVE EXAMPLE 1 | E | G | E | GOOD | GOOD | BAD | BAD |
| COMPARATIVE EXAMPLE 2 | F | H | F | GOOD | GOOD | BAD | BAD |
| COMPARATIVE EXAMPLE 3 | G | I | G | GOOD | GOOD | BAD | BAD |
| COMPARATIVE EXAMPLE 4 | — | J | A | BAD | GOOD | GOOD | GOOD |
| COMPARATIVE EXAMPLE 5 | A | K | H | GOOD | BAD | BAD | BAD |
| COMPARATIVE EXAMPLE 6 | C | L | C | GOOD | BAD | GOOD | GOOD |
| COMPARATIVE EXAMPLE 7 | E | M | I | GOOD | BAD | BAD | BAD |
| COMPARATIVE EXAMPLE 8 | A | N | J | GOOD | BAD | BAD | BAD |
| COMPARATIVE EXAMPLE 9 | C | O | K | GOOD | BAD | BAD | BAD |

| | $C_l$ | a | $b_1$ | $b_2$ | $c_1$ | $c_2$ | $d_1$ | $d_2$ |
|---|---|---|---|---|---|---|---|---|
| ESTER WAX A | 44 | 70 | 4 | 3 | 3 | 15 | 70 | 70 |
| ESTER WAX B | 44 | 75 | 3 | 3 | 2 | 15 | 95 | 70 |
| ESTER WAX C | 44 | 75 | 3 | 2 | 0 | 5 | 90 | 90 |
| ESTER WAX D | 44 | 80 | 3 | 4 | 0 | 5 | 90 | 90 |
| ESTER WAX E | 44 | 65 | 3 | 3 | 5 | 18 | 85 | 82 |
| ESTER WAX F | 44 | 80 | 3 | 4 | 5 | 18 | 90 | 75 |
| ESTER WAX G | 42 | 70 | 5 | 3 | 1 | 15 | 65 | 55 |
| ESTER WAX H | 44 | 60 | 3 | 4 | 5 | 38 | 70 | 70 |
| ESTER WAX I | 44 | 65 | 3 | 3 | 10 | 15 | 60 | 60 |
| ESTER WAX J | 44 | 80 | 3 | 3 | 10 | 40 | 85 | 50 |
| ESTER WAX K | 44 | 70 | 4 | 5 | 10 | 40 | 80 | 50 |
| ESTER WAX L | 44 | 60 | 2 | 3 | 5 | 15 | 95 | 85 |
| ESTER WAX M | 46 | 70 | 3 | 2 | 3 | 5 | 90 | 95 |
| ESTER WAX N | 46 | 70 | 3 | 2 | 3 | 5 | 90 | 95 |
| ESTER WAX O | 44 | 75 | 1 | 1 | 100 | 100 | 100 | 100 |

FIG. 3

| | CRYSTALLINE POLYESTER RESIN | ESTER WAX | SILICA PARTICLES $\alpha$ | LOW-TEMPERATURE FIXABILITY | STORAGE STABILITY | HEAT RESISTANCE | ELECTRIC CHARGE AMOUNT |
|---|---|---|---|---|---|---|---|
| EXAMPLE 1 | D | A | A | GOOD | GOOD | GOOD | GOOD |
| EXAMPLE 2 | G | B | B | GOOD | GOOD | GOOD | GOOD |
| EXAMPLE 3 | B | C | C | GOOD | GOOD | GOOD | GOOD |
| EXAMPLE 4 | G | D | D | GOOD | GOOD | GOOD | GOOD |
| EXAMPLE 5 | C | E | A | GOOD | GOOD | GOOD | GOOD |
| EXAMPLE 6 | F | F | C | GOOD | GOOD | GOOD | GOOD |
| COMPARATIVE EXAMPLE 1 | E | G | E | GOOD | GOOD | BAD | BAD |
| COMPARATIVE EXAMPLE 2 | F | H | F | GOOD | GOOD | BAD | BAD |
| COMPARATIVE EXAMPLE 3 | G | I | G | GOOD | GOOD | BAD | BAD |
| COMPARATIVE EXAMPLE 4 | – | J | A | BAD | GOOD | GOOD | GOOD |
| COMPARATIVE EXAMPLE 5 | A | K | H | GOOD | BAD | BAD | BAD |
| COMPARATIVE EXAMPLE 6 | C | L | C | GOOD | BAD | GOOD | GOOD |
| COMPARATIVE EXAMPLE 7 | E | M | I | GOOD | BAD | BAD | BAD |
| COMPARATIVE EXAMPLE 8 | A | N | J | GOOD | BAD | BAD | BAD |
| COMPARATIVE EXAMPLE 9 | C | O | K | GOOD | BAD | BAD | BAD |

FIG. 4

TONER, TONER CARTRIDGE, AND IMAGE FORMING APPARATUS

FIELD

Embodiments described herein relate generally to a toner, a toner cartridge, and an image forming apparatus.

BACKGROUND

A toner containing a crystalline polyester resin is known. The toner containing a crystalline polyester resin has excellent low-temperature fixability. The toner containing a crystalline polyester resin, however, has insufficient heat resistance and storage stability. Therefore, in the toner containing a crystalline polyester resin, soft caking is likely to occur under high temperature. The toner in which soft caking occurred is solidified in an image forming apparatus to cause clogging or an image defect. Accordingly, the improvement of the heat resistance and storage stability is required for the toner containing a crystalline polyester resin.

On the other hand, the use of an ester wax having excellent heat resistance improves the heat resistance and storage stability of a toner. However, when an ester wax and a crystalline polyester resin are used together, the dispersibility of the components in a toner is likely to deteriorate. As a result, the electric charge amount of the toner is hardly controlled. In addition, the electric charge amount of the toner is more difficult to maintain under high temperature and high humidity as in an image forming apparatus, and the scattering amount of the toner is likely to decrease. The toner whose scattering amount decreased is deposited in the apparatus to cause contamination.

In this manner, the toner containing a crystalline polyester resin has a difficulty in achieving both excellent low-temperature fixability and maintenance of an electric charge amount at the same time.

DETAILED DESCRIPTION

An object to be achieved by embodiments is to provide a toner having excellent low-temperature fixability, storage stability, and heat resistance, and capable of sufficiently maintaining an electric charge amount even under high temperature and high humidity, and a toner cartridge and an image forming apparatus, in each of which the toner is stored.

A toner according to at least one embodiment includes toner base particles and an external additive. The external additive is adhered to surfaces of the toner base particles.

The toner base particles contain a crystalline polyester resin and an ester wax. The proportion of an ester compound with a carbon number of $C_1$, the content of the ester compound with a carbon number of $C_1$ being highest among the ester compounds constituting the ester wax, is 65 mass % or more with respect to 100 mass % of the ester wax.

The carbon number distribution of the ester compounds constituting the ester wax has only one maximum peak in a region where the carbon number is 43 or more.

The external additive contains silica particles having a volume average primary particle diameter $D_{50}$ of 40 to 75 nm. The moisture content of the silica particles is less than 1.0 mass % with respect to 100 mass % of the silica particles.

Hereinafter, the toner according to at least one embodiment will be described.

The toner according to at least one embodiment includes toner base particles and an external additive.

The toner base particles will be described.

The toner base particles of the embodiment contain a crystalline polyester resin and an ester wax. The toner base particles of at least one embodiment may further contain another binder resin other than the crystalline polyester resin and a colorant in addition to the crystalline polyester resin and the ester wax. The toner base particles of the embodiment may further contain another component other than the crystalline polyester resin, the ester wax, the another binder resin, and the colorant as long as the effect disclosed in the embodiment is obtained.

The crystalline polyester resin will be described.

The toner base particles of the embodiment contain a crystalline polyester resin. The crystalline polyester resin functions as a binder resin. Since the toner base particles contain a crystalline polyester resin, the toner of the embodiment has excellent low-temperature fixability.

In at least one embodiment, a polyester resin in which the ratio of the softening point to the melting temperature (softening point/melting temperature) is between 0.8 and 1.2 is defined as the "crystalline polyester resin". Further, a polyester resin in which the ratio of the softening point to the melting temperature (softening point/melting temperature) is less than 0.8 or more than 1.2 is defined as an "amorphous polyester resin".

As the crystalline polyester resin, for example, a condensation polymer of a dihydric or higher hydric alcohol and a divalent or higher valent carboxylic acid is exemplified.

Examples of the dihydric or higher hydric alcohol include ethylene glycol, 1,2-propylene glycol, 1,3-propylene glycol, 1,4-butanediol, 1,5-pentanediol, 1,6-hexanediol, neopentyl glycol, 1,4-butenediol, polyoxypropylene, polyoxyethylene, glycerin, pentaerythritol, and trimethylolpropane. As the dihydric or higher hydric alcohol, 1,4-butanediol or 1,6-hexanediol is preferred.

Examples of the divalent or higher valent carboxylic acid include adipic acid, oxalic acid, malonic acid, maleic acid, fumaric acid, citraconic acid, itaconic acid, glutaconic acid, succinic acid, phthalic acid, isophthalic acid, terephthalic acid, sebacic acid, azelaic acid, succinic acid substituted with an alkyl group or an alkenyl group, cyclohexane dicarboxylic acid, trimellitic acid, pyromellitic acid, and an acid anhydride thereof or an ester thereof.

Examples of the succinic acid substituted with an alkyl group or an alkenyl group include succinic acid substituted with an alkyl group or an alkenyl group having 2 to 20 carbon atoms. For example, n-dodecenyl succinic acid, n-dodecyl succinic acid, and the like are exemplified. As the divalent or higher valent carboxylic acid, fumaric acid is preferred according to some embodiments.

However, the crystalline polyester resin is not limited to the condensation polymer of a dihydric or higher hydric alcohol and a divalent or higher valent carboxylic acid exemplified here. As the crystalline polyester resin, any one type may be used by itself or two or more types may be used in combination according to some embodiments.

The mass average molecular weight of the crystalline polyester resin is preferably between $6 \times 10^3$ and $18 \times 10^3$, and more preferably between $8 \times 10^3$ and $14 \times 10^3$. When the mass average molecular weight of the crystalline polyester resin is the above lower limit or more, the toner has a better low-temperature fixability. In addition, when the mass average molecular weight of the crystalline polyester resin is the above upper limit or less, the toner has excellent storage stability, and also has excellent low-temperature offset resistance.

The mass average molecular weight as used herein is a value in terms of polystyrene measured by gel permeation chromatography.

The melting point of the crystalline polyester resin is preferably between 60 and 120° C., more preferably between 70 and 115° C., and further more preferably between 80 and 110° C. When the melting point of the crystalline polyester resin is the above lower limit or more, the toner has a better storage stability and heat resistance. When the melting point of the crystalline polyester resin is the above upper limit or less, the toner has a better low-temperature fixability.

The melting point of the crystalline polyester resin can be measured by, for example, differential scanning calorimetry (DSC).

The another binder resin will be described.

Examples of the another binder resin include an amorphous polyester resin, a styrene-based resin, an ethylene-based resin, an acrylic resin, a phenolic resin, an epoxy-based resin, an allyl phthalate-based resin, a polyamide-based resin, or a maleic acid-based resin. However, the another binder resin is not limited to those exemplified here.

As the another binder resin, any one type may be used by itself or two or more types may be used in combination.

As the another binder resin, an amorphous polyester resin is preferred from the viewpoint that the effect disclosed in the embodiment is easily obtained. As the amorphous polyester resin, for example, a condensation polymer of a divalent or higher valent carboxylic acid and a dihydric alcohol is exemplified.

With respect to the amorphous polyester resin, examples of the divalent or higher valent carboxylic acid include a divalent or higher valent carboxylic acid, a divalent or higher valent carboxylic acid anhydride, and a divalent or higher valent carboxylic acid ester. As the divalent or higher valent carboxylic acid ester, a divalent or higher valent carboxylic acid lower alkyl (C1 to C12) ester is exemplified.

With respect to the amorphous polyester resin, examples of the dihydric alcohol include ethylene glycol, diethylene glycol, triethylene glycol, 1,2-propylene glycol, 1,3-propylene glycol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, bisphenol A, hydrogenated bisphenol A, and an alkylene oxide adduct of bisphenol A. However, the dihydric alcohol is not limited to those exemplified here.

As the alkylene oxide adduct of bisphenol A, a compound obtained by adding 1 to 10 moles on the average of an alkylene oxide having 2 to 3 carbon atoms to bisphenol A is exemplified. Examples of the alkylene oxide adduct of bisphenol A include polyoxypropylene (2.2)-2,2-bis(4-hydroxyphenyl)propane, polyoxypropylene (3.3)-2,2-bis(4-hydroxyphenyl)propane, polyoxyethylene (2.0)-2,2-bis(4-hydroxyphenyl)propane, polyoxypropylene (2.0)-polyoxyethylene (2.0)-2,2-bis(4-hydro xyphenyl)propane, and polyoxypropylene (6)-2,2-bis(4-hydroxyphenyl)propane.

As the dihydric alcohol, an alkylene oxide adduct of bisphenol A is preferred. As the dihydric alcohol, any one type may be used by itself or two or more types may be used in combination.

The another binder resin is obtained by, for example, polymerizing one type or a plurality of types of vinyl polymerizable monomers.

Examples of the vinyl polymerizable monomer include an aromatic vinyl monomer, an ester-based monomer, a carboxylic acid-containing monomer, and an amine-based monomer.

Examples of the aromatic vinyl monomer include styrene, methylstyrene, methoxystyrene, phenyl styrene, chlorostyrene, and derivatives thereof.

Examples of the ester-based monomer include methyl acrylate, ethyl acrylate, butyl acrylate, methyl methacrylate, ethyl methacrylate, butyl methacrylate, and derivatives thereof.

Examples of the carboxylic acid-containing monomer include acrylic acid, methacrylic acid, fumaric acid, maleic acid, and derivatives thereof.

Examples of the amine-based monomer include amino acrylate, acrylamide, methacrylamide, vinylpyridine, vinylpyrrolidone, and derivatives thereof.

The another binder resin may be obtained by polycondensation of a polymerizable monomer component composed of an alcohol component and a carboxylic acid component. In the polycondensation of a polymerizable monomer component, various auxiliary agents such as a chain transfer agent, a crosslinking agent, a polymerization initiator, a surfactant, an aggregating agent, a pH adjusting agent, and an anti-foaming agent may be used.

The ester wax will be described.

The ester wax of at least one embodiment is composed of two or more types of ester compounds with a different carbon number. Since the toner base particles contain the ester wax, the toner has excellent heat resistance and storage stability.

In the ester wax of at least one embodiment, an ester compound with a carbon number of $C_1$, the content of which is highest among the ester compounds constituting the ester wax of at least one embodiment, is present. The carbon number $C^1$ is 43 or more, and is preferably between 43 and 56, more preferably between 43 and 52, further more preferably between 44 and 46, and most preferably 44. When the carbon number $C_1$ is the above lower limit or more, the maximum peak of the carbon number distribution of the ester wax is located sufficiently on the high carbon number side. As a result, the toner has a better storage stability and heat resistance. When the carbon number $C_1$ is the above upper limit or less, the ester wax is readily available.

The ester compound with a carbon number of $C_1$ is represented by the following formula (I).

$$R^1COOR^2 \hspace{2cm} (I)$$

In the formula (I), $R^1$ and $R^2$ are each an alkyl group. The total carbon number of $R^1$ and $R^2$ is 42 or more, and is preferably between 42 and 55, more preferably between 42 and 51, further more preferably between 43 and 45, and most preferably 43. When the total carbon number of $R^1$ and $R^2$ is the above lower limit or more, the toner has a better storage stability and heat resistance. When the total carbon number of $R^1$ and $R^2$ is the above upper limit or less, the ester wax is readily available. The carbon number of $R^1$ can be controlled by adjusting the carbon number $C_n$ of the below-mentioned carboxylic acid with a carbon number of $C_n$. The carbon number of $R^2$ can be controlled by adjusting the carbon number $C_m$ of the below-mentioned alcohol with a carbon number of $C_m$.

The proportion of the ester compound with a carbon number of $C_1$ is 65 mass % or more, preferably between 65 and 90 mass %, more preferably between 70 and 90 mass %, and further more preferably between 80 and 90 mass % with respect to 100 mass % of the ester wax. Since the proportion of the ester compound with a carbon number of $C_1$ is the above lower limit or more, the maximum peak of the carbon number distribution of the ester wax becomes sufficiently high. As a result, the toner has excellent storage stability and heat resistance.

When the proportion of the ester compound with a carbon number of $C_1$ is the above upper limit or less, the ester wax is readily available.

The carbon number distribution of the ester wax of the embodiment has only one maximum peak in a region where the carbon number is 43 or more. Therefore, the proportion of an ester compound having a relatively low molecular weight is small. As a result, the toner has excellent storage stability and heat resistance.

In the carbon number distribution of the ester wax of at least one embodiment, the position of the maximum peak is preferably in a region where the carbon number is between 43 and 56, more preferably in a region where the carbon number is between 44 and 52, further more preferably in a region where the carbon number is between 44 and 46, and most preferably at a position where the carbon number is 44. When the position of the maximum peak is in a region where the carbon number is the above lower limit or more, the toner has excellent storage stability and heat resistance. When the position of the maximum peak is in a region where the carbon number is the above upper limit or less, the ester wax is readily available.

The content of each of the ester compounds with the corresponding carbon number in the ester wax can be measured by, for example, mass spectrometry using FD-MS (field desorption mass spectrometry). The total ionic strength of the ester compounds with the corresponding carbon number in the ester wax obtained by the measurement using FD-MS is assumed to be 100. The relative value of the ionic strength of each of the ester compounds with the corresponding carbon number with respect to the total ionic strength is calculated. The calculated relative value is defined as the content of each of the ester compounds with the corresponding carbon number in the ester wax. Further, the carbon number of the ester compound with a carbon number, the relative value of which is highest, is denoted by $C_1$.

The ester wax of at least one embodiment is preferably a condensation polymer of a first monomer group and a second monomer group.

The first monomer group will be described.

The first monomer group is composed of at least three or more types of carboxylic acids. The number of types of carboxylic acids in the first monomer group is preferably 7 types or less, more preferably 5 types or less, and further more preferably 4 types or less from the viewpoint that the ester wax is readily available.

Here, the carbon number of the carboxylic acid, the content of which is highest in the first monomer group, is denoted by $C_n$. The carbon number $C_n$ is preferably between 19 and 28, more preferably between 19 and 24, and further more preferably between 20 and 24. When the carbon number $C_n$ is the above lower limit or more, the heat resistance of the ester wax is improved. When the carbon number $C_n$ is the above upper limit or less, the toner has excellent low-temperature fixability.

The proportion of the carboxylic acid with a carbon number of $C_n$, the content of which is highest, is preferably between 70 and 95 mass %, more preferably between 80 and 95 mass %, and furthermore preferably between 85 and 95 mass % with respect to 100 mass % of the first monomer group. When the proportion of the carboxylic acid with a carbon number of $C_n$ is the above lower limit or more, the maximum peak of the carbon number distribution of the ester wax is easily located sufficiently on the high carbon number side. When the proportion of the carboxylic acid with a carbon number of $C_n$ is the above upper limit or less, the ester wax is readily available.

The proportion of a carboxylic acid with a carbon number of 18 or less in the first monomer group is preferably 5 mass % or less, more preferably between 0 and 5 mass %, and further more preferably between 0 and 1 mass % with respect to 100 mass % of the first monomer group. When the proportion of the carboxylic acid with a carbon number of 18 or less is the above lower limit or more, the ester wax is readily available. When the proportion of the carboxylic acid with a carbon number of 18 or less is the above upper limit or less, the proportion of an ester compound having a relatively low molecular weight in the ester wax becomes small. As a result, the toner has excellent storage stability and heat resistance.

The content of each of the carboxylic acids with the corresponding carbon number in the first monomer group can be measured by, for example, performing mass spectrometry using FD-MS for a product after a methanolysis reaction of the ester wax. The total ionic strength of the carboxylic acids with the corresponding carbon number in the product obtained by the measurement using FD-MS is assumed to be 100. The relative value of the ionic strength of each of the carboxylic acids with the corresponding carbon number with respect to the total ionic strength is calculated. The calculated relative value is defined as the content of each of the carboxylic acids with the corresponding carbon number in the first monomer group. Further, the carbon number of the carboxylic acid with a carbon number, the relative value of which is highest, is denoted by $C_n$.

As the carboxylic acid in the first monomer group, a long-chain carboxylic acid is preferred from the viewpoint that the ester wax is readily available, and a long-chain alkyl carboxylic acid is more preferred. The long-chain carboxylic acid is appropriately selected so that the ester wax meets the predetermined requirements.

The long-chain carboxylic acid is preferably a long-chain carboxylic acid with a carbon number of 19 to 28, and more preferably a long-chain carboxylic acid with a carbon number of 20 to 24. When the carbon number of the long-chain carboxylic acid is the above lower limit or more, the heat resistance of the ester wax is improved, and the toner has excellent storage stability and heat resistance. When the carbon number of the long-chain carboxylic acid is the above upper limit or less, the toner has excellent low-temperature fixability.

Examples of the long-chain alkyl carboxylic acid include palmitic acid, stearic acid, arachidonic acid, behenic acid, lignoceric acid, cerotic acid, and montanic acid.

The second monomer group will be described.

The second monomer group is composed of at least two or more types of alcohols. The number of types of alcohols in the second monomer group is preferably 5 types or less, more preferably 4 types or less, and further more preferably 3 types or less from the viewpoint that the ester wax is readily available.

Here, the carbon number of the alcohol, the content of which is highest in the second monomer group, is denoted by $C_m$. The carbon number $C_m$ is preferably between 19 and 28, more preferably between 20 and 24, and further more preferably between 20 and 22. When the carbon number $C_m$ is the above lower limit or more, the heat resistance of the ester wax is improved. When the carbon number $C_m$ is the above upper limit or less, the toner has excellent low-temperature fixability.

The proportion of the alcohol with a carbon number of $C_m$, the content of which is highest, is preferably between 70 and 90 mass %, more preferably between 80 and 90 mass %, and further more preferably between 85 and 90 mass % with respect to 100 mass % of the second monomer group. When the proportion of the alcohol with a carbon number of $C_m$ is the above lower limit or more, the maximum peak of the carbon number distribution of the ester wax is easily located sufficiently on the high carbon number side. When the proportion of the alcohol with a carbon number of $C_m$ is the above upper limit or less, the ester wax is readily available.

The proportion of an alcohol with a carbon number of 18 or less in the second monomer group is preferably 20 mass % or less, more preferably between 10 and 20 mass %, and further more preferably between 15 and 20 mass % with respect to 100 mass % of the second monomer group. When the proportion of the alcohol with a carbon number of 18 or less is the above lower limit or more, the ester wax is readily available. When the proportion of the alcohol with a carbon number of 18 or less is the above upper limit or less, the proportion of an ester compound having a relatively low molecular weight in the ester wax becomes small. As a result, the toner has excellent storage stability and heat resistance.

The content of each of the alcohols with the corresponding carbon number in the second monomer group can be measured by, for example, performing mass spectrometry using FD-MS for a product after a methanolysis reaction of the ester wax. The total ionic strength of the alcohols with the corresponding carbon number in the product obtained by the measurement using FD-MS is assumed to be 100. The relative value of the ionic strength of each of the alcohols with the corresponding carbon number with respect to the total ionic strength is calculated. The calculated relative value is defined as the content of each of the alcohols with the corresponding carbon number in the second monomer group. Further, the carbon number of the alcohol with a carbon number, the relative value of which is highest, is denoted by $C_m$.

As the alcohol in the second monomer group, a long-chain alcohol is preferred from the viewpoint that the ester wax is readily available, and a long-chain alkyl alcohol is more preferred. The long-chain alcohol is appropriately selected so that the ester wax meets the predetermined requirements. The long-chain alcohol is preferably a long-chain alcohol with a carbon number of 19 to 28, and more preferably a long-chain alcohol with a carbon number of 20 to 22. When the carbon number of the long-chain alcohol is the above lower limit or more, the heat resistance of the ester wax is improved, and the toner has excellent storage stability and heat resistance. When the carbon number of the long-chain alcohol is the above upper limit or less, the toner has excellent low-temperature fixability.

Examples of the long-chain alkyl alcohol include palmityl alcohol, stearyl alcohol, arachidyl alcohol, behenyl alcohol, lignoceryl alcohol, ceryl alcohol, and montanyl alcohol.

A method for preparing the ester wax will be described.

The ester wax can be prepared by, for example, subjecting a long-chain carboxylic acid and a long-chain alcohol to an esterification reaction. In the esterification reaction, at least three or more types of long-chain alkyl carboxylic acids and at least two or more types of long-chain alkyl alcohols are preferably used from the viewpoint that the ester wax that meets the predetermined requirements is easily obtained. When the using amount of each of the at least three types of long-chain alkyl carboxylic acids and the at least two types of long-chain alkyl alcohols is adjusted, the carbon number distribution of the ester compounds contained in the ester wax can be adjusted. The esterification reaction is preferably performed while heating under a nitrogen gas stream.

The esterification reaction product may be purified by being dissolved in a solvent containing ethanol, toluene, or the like, and further adding a basic aqueous solution such as a sodium hydroxide aqueous solution to separate the solution into an organic layer and an aqueous layer. By removing the aqueous layer, the ester wax can be obtained. The purification operation is preferably repeated a plurality of times.

The colorant will be described.

The colorant is not particularly limited. Examples thereof include carbon black, cyan, yellow, and magenta-based pigments and dyes.

Examples of the carbon black include aniline black, lamp black, acetylene black, furnace black, thermal black, channel black, and Ketjen black.

Examples of the pigments and dyes include Fast Yellow G, benzidine yellow, chrome yellow, quinoline yellow, Indofast Orange, Irgazin Red, Carmine FB, Permanent Bordeaux FRR, Pigment Orange R, Lithol Red 2G, Lake Red C, Rhodamine FB, Rhodamine B Lake, Du Pont Oil Red, Phthalocyanine Blue, Pigment Blue, aniline blue, Calcoil Blue, ultramarine blue, brilliant green B, phthalocyanine green, malachite green oxalate, methylene blue chloride, Rose Bengal, and quinacridone.

Examples of the colorant include C.I. Pigment Black 1, 6, and 7, C.I. Pigment Yellow 1, 12, 14, 17, 34, 74, 83, 97, 155, 180, and 185, C.I. Pigment Orange 48 and 49, C.I. Pigment Red 5, 12, 31, 48, 48:1, 48:2, 48:3, 48:4, 48:5, 49, 53, 53:1, 53:2, 53:3, 57, 57:1, 81, 81:4, 122, 146, 150, 177, 185, 202, 206, 207, 209, 238, and 269, C.I. Pigment Blue 15, 15:1, 15:2, 15:3, 15:4, 15:5, 15:6, 75, 76, and 79, C.I. Pigment Green 1, 7, 8, 36, 42, and 58, C.I. Pigment Violet 1, 19, and 42, and C. I. Acid Red 52, each of which is indicated by the Color Index Number. However, the colorant is not limited to those exemplified here.

As the colorant, any one type may be used by itself or two or more types may be used in combination.

The another component will be described.

Examples of the another component include additives such as a charge control agent, a surfactant, a basic compound, an aggregating agent, a pH adjusting agent, and an antioxidant. However, the additive is not limited to those exemplified here. As the additive, any one type may be used by itself or two or more types may be used in combination.

The charge control agent will be described.

When the toner base particles contain a charge control agent, the toner is easily transferred onto a recording medium such as paper. Examples of the charge control agent include a metal-containing azo compound, a metal-containing salicylic acid derivative compound, a hydrophobized metal oxide, and a polysaccharide inclusion compound. As the metal-containing azo compound, a complex or a complex salt in which the metal is iron, cobalt, or chromium, or a mixture thereof is preferred. As the metal-containing salicylic acid derivative compound and the hydrophobized metal oxide, a complex or a complex salt in which the metal is zirconium, zinc, chromium, or boron, or a mixture thereof is preferred. As the polysaccharide inclusion compound, a polysaccharide inclusion compound containing aluminum (Al) and magnesium (Mg) is preferred.

The composition of the toner base particles will be described.

The content of the crystalline polyester resin is preferably between 5 and 25 mass %, more preferably between 5 and 20 mass %, and furthermore preferably between 5 and 15 mass % with respect to 100 mass % of the toner base particles. When the content of the crystalline polyester resin is the above lower limit or more, the toner has excellent low-temperature fixability. Further, when the content of the crystalline polyester resin is the above upper limit or less, the toner has excellent low-temperature offset resistance and high-temperature offset resistance.

The content of the ester wax is preferably between 3 and 15 mass %, more preferably between 3 and 13 mass %, and further more preferably between 5 and 10 mass % with respect to 100 mass % of the toner base particles. When the content of the ester wax is the above lower limit or more, the toner has excellent storage stability and heat resistance. Further, when the content of the ester wax is the above upper limit or less, the toner has excellent low-temperature fixability, and the electric charge amount is easily sufficiently maintained.

When the toner base particles contain an amorphous polyester resin, the content of the amorphous polyester resin is preferably between 60 and 90 mass %, more preferably between 65 and 85 mass %, and further more preferably between 70 and 80 mass % with respect to 100 mass % of the toner base particles. When the content of the amorphous polyester resin is the above lower limit or more, the toner has excellent offset resistance. Further, when the content of the amorphous polyester resin is the above upper limit or less, the toner has excellent low-temperature fixability.

When the toner base particles contain a colorant, the content of the colorant is preferably between 2 and 13 mass %, and more preferably between 3 and 8 mass % with respect to 100 mass % of the toner base particles. When the content of the colorant is the above lower limit or more, the toner has excellent color reproducibility. Further, when the content of the colorant is the above upper limit or less, the dispersibility of the colorant is excellent and the toner has excellent low-temperature fixability. In addition, the electric charge amount of the toner is easily controlled.

The external additive will be described.

The external additive contains specific silica particles α. The silica particles α have a volume average primary particle diameter $D_{50}$ of 40 to 75 nm, and the moisture content is less than 1.0 mass % with respect to 100 mass % of the silica particles α. As the silica particles α, hydrophobic silica particles are preferred from the viewpoint that the toner has excellent heat resistance. The hydrophobic silica particles are obtained by, for example, hydrophobizing a surface silanol group of the below-mentioned wet silica with silane, silicone, or the like. When the hydrophobic silica particles are used as the external additive of the toner, the adhesiveness thereof to the toner base particles is improved.

The degree of hydrophobization of the hydrophobic silica can be measured by, for example, the following method. Ion exchanged water (50 mL) and a sample (0.2 g) are placed in a beaker, and methanol is added dropwise thereto from a burette while stirring using a magnetic stirrer. Then, a powder gradually precipitates as the concentration of methanol in the beaker increases, and the volume percent of methanol in a mixed solution of methanol and ion exchanged water at the end point when the total amount thereof precipitated is defined as the degree of hydrophobization (%).

The volume average primary particle diameter $D_{50}$ of the silica particles α is between 40 and 75 nm, preferably between 40 and 70 nm, and more preferably between 40 and 60 nm. When the volume average primary particle diameter $D_{50}$ of the silica particles α is the above lower limit or more, the electric charge amount of the toner of at least one embodiment becomes large, and the scattering amount of the toner is sufficiently maintained. When the volume average primary particle diameter $D_{50}$ of the silica particles α is the above upper limit or less, the toner of at least one embodiment is less likely to be excessively charged, so that the scattering amount of the toner is less likely to become excessively large. As a result, damage to a photoconductor in an image forming apparatus is reduced.

The moisture content of the silica particles α is less than 1.0 mass %, preferably 0.7 mass % or less, more preferably 0.5 mass % or less, and further more preferably 0.3 mass % or less with respect to 100 mass % of the silica particles α. Since the moisture content of the silica particles α is the above upper limit or less, the heat resistance of the toner is improved. As a result, the toner of the embodiment can sufficiently maintain the electric charge amount even under high temperature and high humidity while having excellent low-temperature fixability. The moisture content of the silica particles α is preferably as small as possible, and the lower limit is not particularly limited. The moisture content of the silica particles α can be measured using, for example, a Karl-Fischer method.

As the silica particles α, wet silica is preferred from the viewpoint that the electric charge amount of the toner is more sufficiently maintained. The wet silica can be produced by, for example, a method (liquid phase method) in which sodium silicate made from silica sand is used as a raw material, and an aqueous solution containing sodium silicate is neutralized to deposit silica, and the silica is filtered and dried. On the other hand, fumed silica (dry silica) obtained by reacting silicon tetrachloride in a flame at high temperature is known. When wet silica is used as the external additive of the toner, the electric charge amount of the toner is generally easily maintained as compared with fumed silica having a low moisture content.

The shape of the silica particle α is preferably a spherical shape, and more preferably a true spherical shape.

The external additive may further contain silica particles β other than the silica particles α. Examples of the silica particles β include silica particles having a volume average primary particle diameter $D_{50}$ of less than 40 nm, and silica particles having a volume average primary particle diameter $D_{50}$ of more than 75 nm.

The silica particles β may be wet silica or fumed silica. However, wet silica is preferred from the viewpoint that the electric charge amount of the toner is more sufficiently maintained.

The external additive preferably further contains either one or both of strontium titanate and titanium oxide in addition to the silica particles α. When the external additive further contains either one or both of strontium titanate and titanium oxide, the electric charge amount of the toner is less likely to become excessively large. In addition, the electric charge amount distribution of the toner is likely to show a sharp shape. As a result, the scattering amount of the toner is less likely to become excessively large, and damage to a photoconductor in an image forming apparatus is reduced. Further, the electric charge amount of the toner is moderately maintained even under low temperature and low humidity.

The external additive may further contain another inorganic oxide other than the silica particles, strontium titanate, and titanium oxide. Examples of the another inorganic oxide include alumina and tin oxide.

The silica particles and particles composed of an inorganic oxide may be subjected to a surface treatment with a hydrophobizing agent from the viewpoint of improving the storage stability. As the inorganic oxide, any one type may be used by itself or two or more types may be used in combination.

The content of the external additive is preferably between 2 and 15 parts by mass, more preferably between 4 and 10 parts by mass, and further more preferably between 4 and 8 parts by mass with respect to 100 parts by mass of the toner base particles. When the content of the external additive is the above lower limit or more, the electric charge amount of the toner is easily ensured. Therefore, the electric charge amount can be more sufficiently maintained even under high temperature and high humidity. When the content of the external additive is the above upper limit or less, the electric charge amount of the toner is less likely to become excessively large. Accordingly, the electric charge amount of the toner is easily maintained in a moderated manner.

A method for producing the toner will be described.

The toner of the embodiment can be produced by mixing the toner base particles and the external additive. By mixing the toner base particles and the external additive, the external additive is adhered to the surfaces of the toner base particles.

The toner base particles of at least one embodiment can be produced by, for example, a kneading and pulverization method or a chemical method.

The kneading and pulverization method will be described.

As the kneading and pulverization method, for example, a production method including the following mixing step, kneading step, and pulverization step is exemplified. The kneading and pulverization method may further include the following classification step as needed.

a mixing step: a step of mixing at least a crystalline polyester resin and an ester wax, thereby obtaining a mixture
  a kneading step: a step of melt-kneading the mixture, thereby obtaining a kneaded material
  a pulverization step: a step of pulverizing the kneaded material, thereby obtaining a pulverized material
  a classification step: a step of classifying the pulverized material In the mixing step, the raw materials of the toner are mixed, thereby obtaining a mixture. In the mixing step, a mixer may be used. The mixer is not particularly limited. In the mixing step, a colorant, another binder resin, or an additive may be used as needed.

In the kneading step, the mixture obtained in the mixing step is melt-kneaded, thereby obtaining a kneaded material. In the kneading step, a kneader may be used. The kneader is not particularly limited.

In the pulverization step, the kneaded material obtained in the kneading step is pulverized, thereby obtaining a pulverized material. In the pulverization step, a pulverizer may be used. As the pulverizer, various pulverizers such as a hammer mill can be used. In addition, the pulverized material obtained using a pulverizer may be further finely pulverized. As a pulverizer used for further finely pulverizing the pulverized material, various pulverizers can be used. The pulverized material obtained in the pulverization step may be directly used as the toner base particles, or may be used as the toner base particles through a classification step as needed.

In the classification step, the pulverized material obtained in the pulverization step is classified. In the classification step, a classifier may be used. The classifier is not particularly limited.

The chemical method will be described.

In the chemical method, a crystalline polyester resin, an ester wax, and according to need, another binder resin or an additive are mixed, thereby obtaining a mixture. Subsequently, the mixture is melt-kneaded, thereby obtaining a kneaded material. Subsequently, the kneaded material is pulverized, thereby obtaining coarsely granulated moderately pulverized particles. Subsequently, the moderately pulverized particles are mixed with an aqueous medium, thereby preparing a mixed liquid. Subsequently, the mixed liquid is subjected to mechanical shearing, thereby obtaining a fine particle dispersion liquid. Finally, the fine particles are aggregated in the fine particle dispersion liquid, thereby forming toner base particles.

A method for adding the external additive will be described.

The external additive is mixed with the toner base particles using, for example, a mixer. The mixer is not particularly limited.

The external additive may be sieved using a sieving device as needed. The sieving device is not particularly limited. Various sieving devices can be used.

The toner cartridge of the embodiment will be described.

In the toner cartridge of the embodiment, the toner of the embodiment described above is stored. For example, the toner cartridge has a container, and the toner of the embodiment is stored in the container. The container is not particularly limited, and various containers that can be applied to an image forming apparatus can be used.

The toner of at least one embodiment may be used as a one-component developer or may be combined with a carrier and used as a two-component developer.

The image forming apparatus of at least one embodiment will be described with reference to the drawings.

Figure 1:
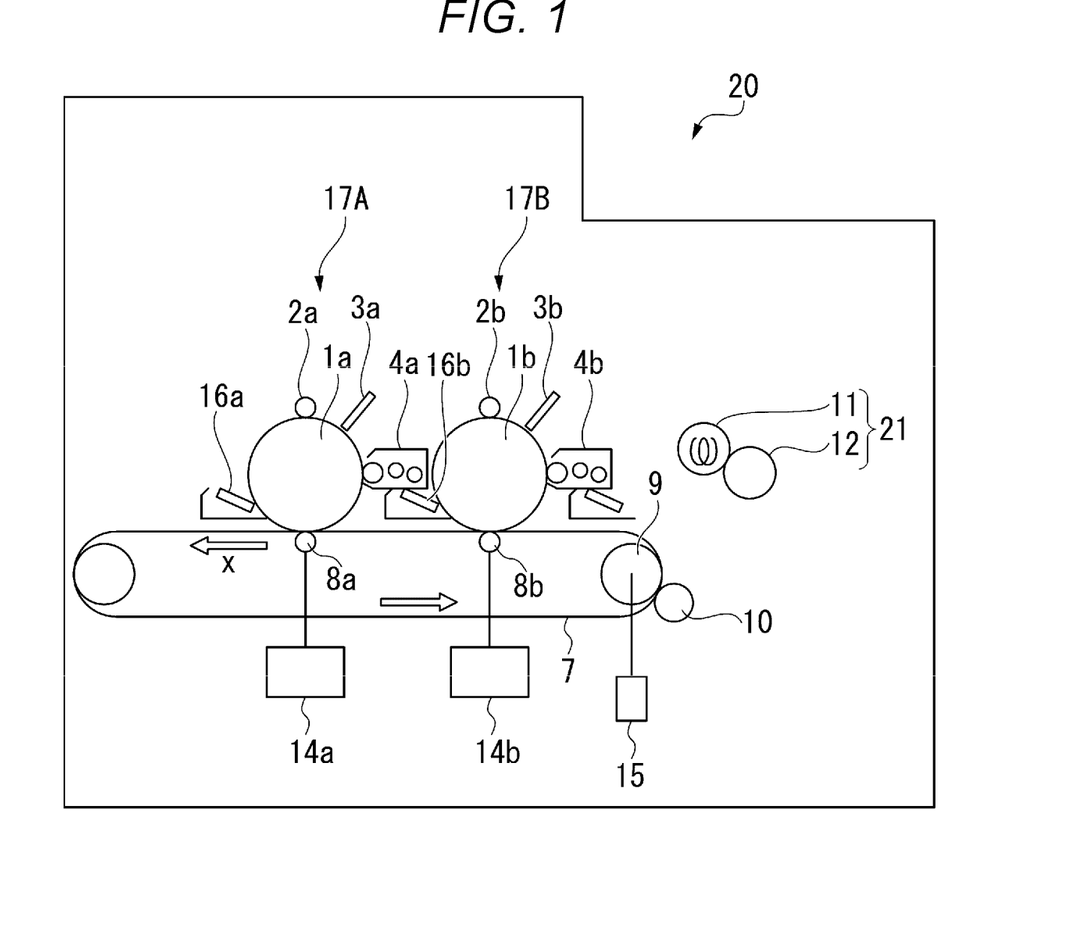
FIG. 1 shows an image forming apparatus according to at least one embodiment.

FIG. 1 is a view showing an example of a schematic structure of the image forming apparatus of at least one embodiment.

An image forming apparatus 20 of at least one embodiment includes an apparatus main body including an intermediate transfer belt 7, and a first image forming unit 17A and a second image forming unit 17B provided in this order on the intermediate transfer belt 7, and a fixing device 21 provided downstream thereof. Along the running direction X of the intermediate transfer belt 7, that is, along the direction of progress of the image forming process, the first image forming unit 17A is provided downstream of the second image forming unit 17B. The fixing device 21 is provided downstream of the first image forming unit 17A.

The first image forming unit 17A includes a photoconductive drum 1a, a cleaning device 16a, a charging device 2a, a light exposure device 3a, a first developing device 4a, and a primary transfer roller 8a. The cleaning device 16a, the charging device 2a, the light exposure device 3a, and the first developing device 4a are provided in this order along the rotational direction of the photoconductive drum 1a. The primary transfer roller 8a is provided on the photoconductive drum 1a through the intermediate transfer belt 7 so as to face the photoconductive drum 1a. To the primary transfer roller 8a, a primary transfer power supply 14a is connected.

The second image forming unit 17B includes a photoconductive drum 1b, a cleaning device 16b, a charging device 2b, a light exposure device 3b, a second developing device 4b, and a primary transfer roller 8b. The cleaning device 16b, the charging device 2b, the light exposure device 3b, and the second developing device 4b are provided in this order along the rotational direction of the photoconductive drum 1b. The primary transfer roller 8b is provided on the photoconductive drum 1b through the intermediate transfer belt 7 so as to face the photoconductive drum 1b. To the primary transfer roller 8b, a primary transfer power supply 14b is connected.

In the first developing device 4a and in the second developing device 4b, the toner of the embodiment described above is stored. In an image forming apparatus according to another embodiment, the toner may be supplied from a toner cartridge (not shown).

Downstream of the first image forming unit 17A, a secondary transfer roller 9 and a backup roller 10 are disposed so as to face each other through the intermediate transfer belt 7. To the secondary transfer roller 9, a secondary transfer power supply 15 is connected.

The fixing device 21 is provided downstream of the first image forming unit 17A. The fixing device 21 includes a heat roller 11 and a press roller 12 disposed so as to face each other. The fixing device 21 is a device for fixing the toner to a recording medium. A toner image is fixed to paper by heating and pressurization using the heat roller 11 and the press roller 12.

By the image forming apparatus 20, image formation is performed, for example, as follows.

First, by the charging device 2b, the photoconductive drum 1b is uniformly charged. Subsequently, by the light exposure device 3b, light exposure is performed, whereby an electrostatic latent image is formed. Subsequently, the electrostatic latent image is developed using the toner of the embodiment supplied from the developing device 4b, whereby a second toner image is obtained.

Subsequently, by the charging device 2a, the photoconductive drum 1a is uniformly charged. Subsequently, by the light exposure device 3a, light exposure is performed based on the first image information (second toner image), whereby an electrostatic latent image is formed. Subsequently, the electrostatic latent image is developed using the toner of the embodiment supplied from the developing device 4a, whereby a first toner image is obtained.

The second toner image and the first toner image are transferred in this order onto the intermediate transfer belt 7 using the primary transfer rollers 8a and 8b.

An image in which the second toner image and the first toner image are stacked in this order on the intermediate transfer belt 7 is secondarily transferred onto a recording medium (not shown) through the secondary transfer roller 9 and the backup roller 10. By doing this, an image in which the first toner image and the second toner image are stacked in this order is formed on the recording medium.

The image forming apparatus shown in FIG. 1 is configured to fix a toner image. However, the image forming apparatus of the embodiment is not limited to this configuration. An image forming apparatus according to another embodiment may be, for example, configured to use an inkjet system.

The toner of at least one embodiment described above has excellent low-temperature fixability, storage stability, and heat resistance, and can sufficiently maintain the electric charge amount even under high temperature and high humidity.

Hereinafter, embodiments will be more specifically described by showing Examples.

Preparation of ester waxes A to O used in the respective Examples will be described.

Into a four-neck flask equipped with a stirrer, a thermocouple, and a nitrogen introduction tube, 80 parts by mass of at least three or more types of long-chain alkyl carboxylic acids and 20 parts by mass of at least two or more types of long-chain alkyl alcohols were placed. An esterification reaction was performed at 220° C. under a nitrogen gas stream, whereby a reaction product was obtained. To the obtained reaction product, a mixed solvent of toluene and ethanol was added, thereby dissolving the reaction product. Further, a sodium hydroxide aqueous solution was added to the flask, and the resultant was stirred at 70° C. for 30 minutes. Further, the flask was left to stand for 30 minutes to separate the contents of the flask into an organic layer and an aqueous layer, and then, the aqueous layer was removed from the contents. Thereafter, ion exchanged water was added to the flask, and the resultant was stirred at 70° C. for 30 minutes. The flask was left to stand for 30 minutes to separate the contents of the flask into an aqueous layer and an organic layer, and then, the aqueous layer was removed from the contents. Such an operation was repeated five times. The solvent was distilled off from the organic layer in the contents of the flask under a decompressed condition, whereby an ester wax A was obtained.

Ester waxes B to O were obtained in the same manner as the ester wax A except that the types of the long-chain alkyl carboxylic acids and the long-chain alkyl alcohols used, and the using amounts thereof were changed.

The long-chain alkyl carboxylic acids used are as follows.
Palmitic acid ($C_{16}H_{32}O_2$)
Stearic acid ($C_{18}H_{36}O_2$)
Arachidonic acid ($C_{20}H_{40}O_2$)
Behenic acid ($C_{22}H_{44}O_2$)
Lignoceric acid ($C_{24}H_{48}O_2$)
Cerotic acid ($C_{26}H_{52}O_2$)
Montanic acid ($C_{28}H_{56}O_2$)

The long-chain alkyl alcohols used are as follows.
Palmityl alcohol ($C_{16}H_{34}O$)
Stearyl alcohol ($C_{18}H_{38}O$)
Arachidyl alcohol ($C_{20}H_{42}O$)
Behenyl alcohol ($C_{22}H_{46}O$)
Lignoceryl alcohol ($C_{24}H_{50}O$)
Ceryl alcohol ($C_{26}H_{54}O$)
Montanyl alcohol ($C_{28}H_{58}O$)

Crystalline polyester resins A to G used in the respective Examples will be described.

The mass average molecular weight Mw and the melting point of each of the crystalline polyester resins A to G were as follows, respectively.

Crystalline polyester resin A (Mw: 8000, melting point: 65° C.)
Crystalline polyester resin B (Mw: 8300, melting point: 70° C.)
Crystalline polyester resin C (Mw: 8500, melting point: 80° C.)
Crystalline polyester resin D (Mw: 9000, melting point: 85° C.)
Crystalline polyester resin E (Mw: 9300, melting point: 90° C.)

Crystalline polyester resin F (Mw: 9500, melting point: 100° C.)

Crystalline polyester resin G (Mw: 13000, melting point: 110° C.)

The mass average molecular weight of an amorphous polyester resin used in the respective Examples was 20000, and the melting point thereof was 110° C.

A method for measuring the moisture content of the silica particles will be described.

The moisture content of the silica particles was measured by a Karl-Fischer method. In the measurement, a moisture vaporizer VA-122 manufactured by Mitsubishi Chemical Corporation and a moisture meter CA-100 manufactured by Mitsubishi Chemical Corporation were used. As an anolyte for the moisture meter, Aquamicron AX (manufactured by Mitsubishi Chemical Corporation) was used. As a catholyte, Aquamicron CXU (manufactured by Mitsubishi Chemical Corporation) was used. In the measurement, a background value was fixed to 0.20 (μg/sec), and the measurement was continuously performed until the moisture content to be detected decreased to below the background value. When performing a heating treatment using an electric heater of the moisture vaporizer, a hydrophobized spherical silica fine powder was prevented from being exposed to the outside air, and moisture generated from the moisture vaporizer was introduced into a Karl-Fischer device accompanied with high purity argon at 300 mL/min, and the moisture amount was measured. In the following Examples, the hydrophobized spherical silica fine powder was charged in the device after the powder was left to stand for 24 hours under the conditions of a temperature of 25° C. and a relative humidity of 55%, and the amount of moisture generated until the heating temperature of the electric heater of the moisture vaporizer reached 200° C. was defined as "moisture amount".

A method for measuring the volume average primary particle diameter $D_{50}$ will be described.

A laser diffraction particle size distribution analyzer (manufactured by Shimadzu Corporation (SALD-7000)) was used.

The moisture content and $D_{50}$ of silica particles A to K used in the respective Examples were as follows.

Silica particles A (moisture content: 0.5 mass %, $D_{50}$: 50 nm)
Silica particles B (moisture content: 0.1 mass %, $D_{50}$: 70 nm)
Silica particles C (moisture content: 0.1 mass %, $D_{50}$: 50 nm)
Silica particles D (moisture content: 0.6 mass %, $D_{50}$: 70 nm)
Silica particles E (moisture content: 1.4 mass %, $D_{50}$: 58 nm)
Silica particles F (moisture content: 2.9 mass %, $D_{50}$: 48 nm)
Silica particles G (moisture content: 3.4 mass %, $D_{50}$: 172 nm)
Silica particles H (moisture content: 2.5 mass %, $D_{50}$: 110 nm)
Silica particles I (moisture content: 1.8 mass %, $D_{50}$: 80 nm)
Silica particles J (moisture content: 1.5 mass %, $D_{50}$: 51 nm)
Silica particles K (moisture content: 0.1 mass %, $D_{50}$: 98 nm)

Hydrophobic strontium titanate and hydrophobic titanium oxide used in the respective Examples have a volume average primary particle diameter $D_{50}$ of 20 nm.

Hydrophobic silica β1 used in the respective Examples has a volume average primary particle diameter $D_{50}$ of 30 nm.

Hydrophobic silica β2 used in the respective Examples has a volume average primary particle diameter $D_{30}$ of 82 nm. The hydrophobic silica β2 is a monodispersed inorganic fine particle compound.

A toner of Example 1 was produced as follows.

First, the raw materials of toner base particles were placed in a Henschel mixer (manufactured by Mitsui Mining Co., Ltd.) and mixed. Further, the mixture of the raw materials of the toner base particles was melt-kneaded using a twin-screw extruder. The resulting melt-kneaded material was cooled, and then, coarsely pulverized using a hammer mill. The coarsely pulverized material was finely pulverized using a jet pulverizer. The finely pulverized material was classified, whereby toner base particles were obtained. The volume average particle diameter of the toner base particles was 6 μm.

The composition of the raw materials of the toner base particles is shown below.

Crystalline polyester resin D 10 parts by mass
Ester wax A 3 parts by mass
Amorphous polyester resin 80 parts by mass
Carbon black 6 parts by mass
Charge control agent (polysaccharide inclusion compound containing Al and Mg) 1 part by mass Subsequently, with respect to 100 parts by mass of the toner base particles of Example 1, an external additive having the following composition was mixed using a Henschel mixer, whereby a toner of Example 1 was produced.

Silica particles A 1 part by mass
Hydrophobic strontium titanate 1 part by mass
Hydrophobic silica β1 2 parts by mass
Hydrophobic silica β2 0.8 parts by mass A toner of Example 2 was produced as follows.

First, toner base particles of Example 2 were produced in the same manner as in Example 1 except that the composition of the raw materials of the toner base particles was changed as follows. The volume average particle diameter of the toner base particles of Example 2 was 6 μm.

Crystalline polyester resin G 10 parts by mass
Ester wax B 3 parts by mass
Amorphous polyester resin 80 parts by mass
Carbon black 6 parts by mass
Charge control agent (polysaccharide inclusion compound containing Al and Mg) 1 part by mass Subsequently, a toner of Example 2 was produced by mixing an external additive in the same manner as in Example 1 except that the composition of the external additive was changed as follows.

Silica particles B 1 part by mass
Hydrophobic strontium titanate 1 part by mass
Hydrophobic silica β1 2 parts by mass
Hydrophobic silica β2 0.8 parts by mass A toner of Example 3 was produced as follows.

First, toner base particles of Example 3 were produced in the same manner as in Example 1 except that the composition of the raw materials of the toner base particles was changed as follows. The volume average particle diameter of the toner base particles of Example 3 was 6 μm.

Crystalline polyester resin B 10 parts by mass
Ester wax C 3 parts by mass
Amorphous polyester resin 80 parts by mass
Carbon black 6 parts by mass
Charge control agent (polysaccharide inclusion compound containing Al and Mg) 1 part by mass Subsequently, a toner of Example 3 was produced by mixing an external additive in the same manner as in Example 1 except that the composition of the external additive was changed as follows.

Silica particles C 1 part by mass
Hydrophobic strontium titanate 1 part by mass
Hydrophobic silica β1 2 parts by mass
Hydrophobic silica β2 0.8 parts by mass A toner of Example 4 was produced as follows.

First, toner base particles of Example 4 were produced in the same manner as in Example 1 except that the composition of the raw materials of the toner base particles was changed as follows. The volume average particle diameter of the toner base particles of Example 4 was 6 μm.

Crystalline polyester resin G10 parts by mass
Ester wax D 3 parts by mass
Amorphous polyester resin 80 parts by mass
Carbon black 6 parts by mass
Charge control agent (polysaccharide inclusion compound containing Al and Mg) 1 part by mass Subsequently, a toner of Example 4 was produced by mixing an external additive in the same manner as in Example 1 except that the composition of the external additive was changed as follows.

Silica particles D 1 part by mass
Hydrophobic strontium titanate 1 part by mass
Hydrophobic silica β1 2 parts by mass
Hydrophobic silica β2 0.8 parts by mass A toner of Example 5 was produced as follows.

First, toner base particles of Example 5 were produced in the same manner as in Example 1 except that the composition of the raw materials of the toner base particles was changed as follows. The volume average particle diameter of the toner base particles of Example 5 was 6 μm.

Crystalline polyester resin C10 parts by mass
Ester wax E 3 parts by mass
Amorphous polyester resin 80 parts by mass
Carbon black 6 parts by mass
Charge control agent (polysaccharide inclusion compound containing Al and Mg) 1 part by mass Subsequently, a toner of Example 5 was produced by mixing an external additive in the same manner as in Example 1 except that the composition of the external additive was changed as follows.

Silica particles A 1 part by mass
Hydrophobic strontium titanate 1 part by mass
Hydrophobic silica β1 2 parts by mass
Hydrophobic silica β2 0.8 parts by mass A toner of Example 6 was produced as follows.

First, toner base particles of Example 6 were produced in the same manner as in Example 1 except that the composition of the raw materials of the toner base particles was changed as follows. The volume average particle diameter of the toner base particles of Example 6 was 6 μm.

Crystalline polyester resin F10 parts by mass
Ester wax F 3 parts by mass
Amorphous polyester resin 80 parts by mass
Carbon black 6 parts by mass
Charge control agent (polysaccharide inclusion compound containing Al and Mg) 1 part by mass Subsequently, a toner of Example 6 was produced by mixing an external additive in the same manner as in Example 1 except that the composition of the external additive was changed as follows.

Silica particles C 1 part by mass
Hydrophobic strontium titanate 1 part by mass
Hydrophobic silica β1 2 parts by mass
Hydrophobic silica β2 0.8 parts by mass A toner of Comparative Example 1 was produced as follows.

First, toner base particles of Comparative Example 1 were produced in the same manner as in Example 1 except that the composition of the raw materials of the toner base particles was changed as follows. The volume average particle diameter of the toner base particles of Comparative Example 1 was 6 μm.

Crystalline polyester resin E10 parts by mass
Ester wax G 3 parts by mass
Amorphous polyester resin 80 parts by mass
Carbon black 6 parts by mass
Charge control agent (polysaccharide inclusion compound containing Al and Mg) 1 part by mass Subsequently, a toner of Comparative Example 1 was produced by mixing an external additive in the same manner as in Example 1 except that the composition of the external additive was changed as follows.

Silica particles E 1 part by mass
Hydrophobic titanium oxide 1 part by mass
Hydrophobic silica β1 2 parts by mass
Hydrophobic silica β2 0.8 parts by mass A toner of Comparative Example 2 was produced as follows.

First, toner base particles of Comparative Example 2 were produced in the same manner as in Example 1 except that the composition of the raw materials of the toner base particles was changed as follows. The volume average particle diameter of the toner base particles of Comparative Example 2 was 6 μm.

Crystalline polyester resin F10 parts by mass
Ester wax H 3 parts by mass
Amorphous polyester resin 80 parts by mass
Carbon black 6 parts by mass
Charge control agent (polysaccharide inclusion compound containing Al and Mg) 1 part by mass Subsequently, a toner of Comparative Example 2 was produced by mixing an external additive in the same manner as in Example 1 except that the composition of the external additive was changed as follows.

Silica particles F 1 part by mass
Hydrophobic strontium titanate 1 part by mass
Hydrophobic silica β1 2 parts by mass
Hydrophobic silica β2 0.8 parts by mass A toner of Comparative Example 3 was produced as follows.

First, toner base particles of Comparative Example 3 were produced in the same manner as in Example 1 except that the composition of the raw materials of the toner base particles was changed as follows. The volume average particle diameter of the toner base particles of Comparative Example 3 was 6 μm.

Crystalline polyester resin G10 parts by mass
Ester wax I 3 parts by mass
Amorphous polyester resin 80 parts by mass
Carbon black 6 parts by mass
Charge control agent (polysaccharide inclusion compound containing Al and Mg) 1 part by mass Subsequently, a toner of Comparative Example 3 was produced by mixing an external additive in the same manner as in Example 1 except that the composition of the external additive was changed as follows.

Silica particles G 1 part by mass
Hydrophobic titanium oxide 1 part by mass
Hydrophobic silica β1 2 parts by mass
Hydrophobic silica β2 0.8 parts by mass A toner of Comparative Example 4 was produced as follows.

First, toner base particles of Comparative Example 4 were produced in the same manner as in Example 1 except that the composition of the raw materials of the toner base particles was changed as follows. The volume average particle diameter of the toner base particles of Comparative Example 4 was 6 μm.

Ester wax J 3 parts by mass
Amorphous polyester resin 90 parts by mass
Carbon black 6 parts by mass
Charge control agent (polysaccharide inclusion compound containing Al and Mg) 1 part by mass Subsequently, a toner of Comparative Example 4 was produced by mixing an external additive in the same manner as in Example 1 except that the composition of the external additive was changed as follows.

Silica particles A 1 part by mass
Hydrophobic titanium oxide 1 part by mass
Hydrophobic silica β1 2 parts by mass
Hydrophobic silica β2 0.8 parts by mass A toner of Comparative Example 5 was produced as follows.

First, toner base particles of Comparative Example 5 were produced in the same manner as in Example 1 except that the composition of the raw materials of the toner base particles was changed as follows. The volume average particle diameter of the toner base particles of Comparative Example 5 was 6 μm.

Crystalline polyester resin A 10 parts by mass
Ester wax K 3 parts by mass
Amorphous polyester resin 80 parts by mass
Carbon black 6 parts by mass
Charge control agent (polysaccharide inclusion compound containing Al and Mg) 1 part by mass Subsequently, a toner of Comparative Example 5 was produced by mixing an external additive in the same manner as in Example 1 except that the composition of the external additive was changed as follows.

Silica particles H 1 part by mass
Hydrophobic strontium titanate 1 part by mass
Hydrophobic silica β1 2 parts by mass
Hydrophobic silica β2 0.8 parts by mass A toner of Comparative Example 6 was produced as follows.

First, toner base particles of Comparative Example 6 were produced in the same manner as in Example 1 except that the composition of the raw materials of the toner base particles was changed as follows. The volume average particle diameter of the toner base particles of Comparative Example 6 was 6 μm.

Crystalline polyester resin C 10 parts by mass
Ester wax L 3 parts by mass
Amorphous polyester resin 80 parts by mass
Carbon black 6 parts by mass
Charge control agent (polysaccharide inclusion compound containing Al and Mg) 1 part by mass Subsequently, a toner of Comparative Example 6 was produced by mixing an external additive in the same manner as in Example 1 except that the composition of the external additive was changed as follows.

Silica particles C 1 part by mass
Hydrophobic titanium oxide 1 part by mass
Hydrophobic silica β1 2 parts by mass
Hydrophobic silica β2 0.8 parts by mass A toner of Comparative Example 7 was produced as follows.

First, toner base particles of Comparative Example 7 were produced in the same manner as in Example 1 except that the composition of the raw materials of the toner base particles was changed as follows. The volume average particle diameter of the toner base particles of Comparative Example 7 was 6 μm.

Crystalline polyester resin E 10 parts by mass
Ester wax M 3 parts by mass
Amorphous polyester resin 80 parts by mass
Carbon black 6 parts by mass
Charge control agent (polysaccharide inclusion compound containing Al and Mg) 1 part by mass Subsequently, a toner of Comparative Example 7 was produced by mixing an external additive in the same manner as in Example 1 except that the composition of the external additive was changed as follows.

Silica particles I 1 part by mass
Hydrophobic strontium titanate 1 part by mass
Hydrophobic silica β1 2 parts by mass
Hydrophobic silica β2 0.8 parts by mass A toner of Comparative Example 8 was produced as follows.

First, toner base particles of Comparative Example 8 were produced in the same manner as in Example 1 except that the composition of the raw materials of the toner base particles was changed as follows. The volume average particle diameter of the toner base particles of Comparative Example 8 was 6 μm.

Crystalline polyester resin A 10 parts by mass
Ester wax N 3 parts by mass
Amorphous polyester resin 80 parts by mass
Carbon black 6 parts by mass
Charge control agent (polysaccharide inclusion compound containing Al and Mg) 1 part by mass Subsequently, a toner of Comparative Example 8 was produced by mixing an external additive in the same manner as in Example 1 except that the composition of the external additive was changed as follows.

Silica particles J 1 part by mass
Hydrophobic titanium oxide 1 part by mass
Hydrophobic silica β1 2 parts by mass
Hydrophobic silica β2 0.8 parts by mass A toner of Comparative Example 9 was produced as follows.

First, toner base particles of Comparative Example 9 were produced in the same manner as in Example 1 except that the composition of the raw materials of the toner base particles was changed as follows. The volume average particle diameter of the toner base particles of Comparative Example 9 was 6 μm.

Crystalline polyester resin C 10 parts by mass
Ester wax O 3 parts by mass
Amorphous polyester resin 80 parts by mass
Carbon black 6 parts by mass
Charge control agent (polysaccharide inclusion compound containing Al and Mg) 1 part by mass Subsequently, a toner of Comparative Example 9 was produced by mixing an external additive in the same manner as in Example 1 except that the composition of the external additive was changed as follows.

Silica particles K 1 part by mass
Hydrophobic titanium oxide 1 part by mass
Hydrophobic silica β1 2 parts by mass
Hydrophobic silica β2 0.8 parts by mass A method for measuring the carbon number distribution of the ester compounds (the proportion of each of the ester compounds with the corresponding carbon number) constituting the ester wax will be described.

0.5 g of the toner of each Example was weighed and placed in an Erlenmeyer flask. Subsequently, 2 mL of methylene chloride was added to the Erlenmeyer flask to dissolve the toner.

Further, 4 mL of hexane was added to the Erlenmeyer flask to form a mixed liquid. The mixed liquid was filtered and separated into a filtrate and an insoluble material. The solvent was distilled off from the filtrate under a nitrogen gas stream, whereby a deposited material was obtained. With respect to the deposited material, the carbon number distribution of the ester compounds in the ester wax extracted from the toner was measured.

The proportion of each of the ester compounds with the corresponding carbon number was measured using FD-MS "JMS-T100GC (manufactured by JEOL Ltd.)". The measurement conditions are as follows.

Sample concentration: 1 mg/mL (solvent: chloroform)
Cathode voltage: −10 kv
Spectral recording interval: 0.4 s
Measurement mass range (m/z): between 10 and 2000

The total ionic strength of the ester compounds with the corresponding carbon number obtained by the measurement was assumed to be 100. The relative value of the ionic strength of each of the ester compounds with the corresponding carbon number with respect to the total ionic strength was determined. The relative value was defined as the proportion of each of the ester compounds with the corresponding carbon number in the ester wax. Further, the carbon number of the ester compound with a carbon number, the relative value of which is highest, is denoted by $C_1$.

A method for analyzing the first monomer group and the second monomer group will be described.

1 g of each ester wax was subjected to a methanolysis reaction under the conditions of a temperature of 70° C. for 3 hours. The product after the methanolysis reaction was subjected to mass spectrometry using FD-MS, and the content of each of the long-chain alkyl carboxylic acids with the corresponding carbon number and the content of each of the long-chain alkyl alcohols with the corresponding carbon number were determined.

A method for measuring the carbon number distribution of the carboxylic acids (the proportion of each of the carboxylic acids with the corresponding carbon number) constituting the first monomer group will be described.

The proportion of each of the carboxylic acids with the corresponding carbon number was measured using FD-MS "JMS-T100GC (manufactured by JEOL Ltd.)". The measurement conditions are as follows.

Sample concentration: 1 mg/mL (solvent: chloroform)
Cathode voltage: −10 kv
Spectral recording interval: 0.4 s
Measurement mass range (m/z): between 10 and 2000

The total ionic strength of the carboxylic acids with the corresponding carbon number obtained by the measurement was assumed to be 100. The relative value of the ionic strength of each of the carboxylic acids with the corresponding carbon number with respect to the total ionic strength was determined. The relative value was defined as the proportion of each of the carboxylic acids with the corresponding carbon number in the ester wax. Further, the carbon number of the carboxylic acid with a carbon number, the relative value of which is highest, is denoted by $C_n$.

A method for measuring the carbon number distribution of the alcohols (the proportion of each of the alcohols with the corresponding carbon number) constituting the second monomer group will be described.

The proportion of each of the alcohols with the corresponding carbon number was measured using FD-MS "JMS-T100GC (manufactured by JEOL Ltd.)". The measurement conditions are as follows.

Sample concentration: 1 mg/mL (solvent: chloroform)
Cathode voltage: −10 kv
Spectral recording interval: 0.4 s
Measurement mass range (m/z): between 10 and 2000

The total ionic strength of the alcohols with the corresponding carbon number obtained by the measurement was assumed to be 100. The relative value of the ionic strength of each of the alcohols with the corresponding carbon number with respect to the total ionic strength was determined. The relative value was defined as the proportion of each of the alcohols with the corresponding carbon number in the ester wax. Further, the carbon number of the alcohol with a carbon number, the relative value of which is highest, is denoted by $C_m$.

The ester waxes A to O used in the respective Examples will be described.

With respect to the ester waxes A to O, the carbon number $C_1$ of the ester compound, the content of which is highest, the carbon number $C_n$ of the carboxylic acid, the content of which is highest in the first monomer group, and the carbon number $C_m$ of the alcohol, the content of which is highest in the second monomer group were as follows, respectively.

Ester wax A ($C_1$: 44, $C_n$: 22, $C_m$: 22)
Ester wax B ($C_1$: 44, $C_n$: 20, $C_m$: 24)
Ester wax C ($C_1$: 44, $C_n$: 24, $C_m$: 20)
Ester wax D ($C_1$: 44, $C_n$: 22, $C_m$: 22)
Ester wax E ($C_1$: 44, $C_n$: 20, $C_m$: 24)
Ester wax F ($C_1$: 44, $C_n$: 22, $C_m$: 22)
Ester wax G ($C_1$: 42, $C_n$: 18, $C_m$: 24)
Ester wax H ($C_1$: 44, $C_n$: 18, $C_m$: 26)
Ester wax I ($C_1$: 44, $C_n$: 26, $C_m$: 18)
Ester wax J ($C_1$: 44, $C_n$: 22, $C_m$: 22)
Ester wax K ($C_1$: 44, $C_n$: 20, $C_m$: 24)
Ester wax L ($C_1$: 44, $C_n$: 22, $C_m$: 22)
Ester wax M ($C_1$: 46, $C_n$: 24, $C_m$: 22)
Ester wax N ($C_1$: 46, $C_n$: 22, $C_m$: 22)
Ester wax O ($C_1$: 36, $C_n$: 18, $C_m$: 18)

With respect to the ester waxes A to F and H to N, the carbon number distribution of the ester wax has only one maximum peak in a region where the carbon number is 43 or more. The ester waxes G and O did not meet the condition that the carbon number distribution of the ester wax has only one maximum peak in a region where the carbon number is 43 or more. The properties of the ester waxes A to O obtained from the measurement results of the carbon number distribution are shown in FIG. 2.

Figure 2:
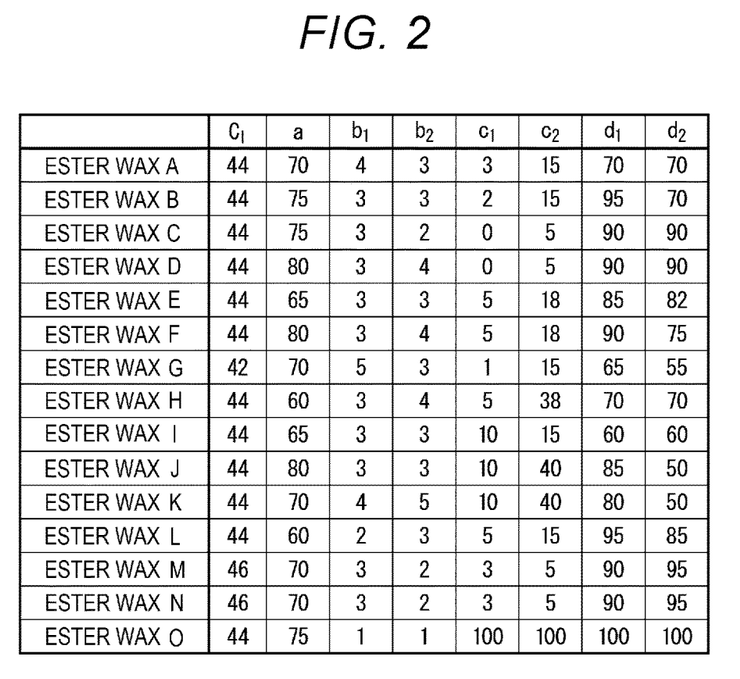
FIG. 2 shows measurement results for ester waxes according to at least one embodiment.

In FIG. 2, $C_1$ is the carbon number of the ester compound, the content of which is highest among the ester compounds constituting the corresponding ester wax. a is the proportion [mass %] of the ester compound with a carbon number of $C_1$ with respect to 100 mass % of the ester wax. $b_1$ is the number of types [types] of carboxylic acids in the first monomer group. $b_2$ is the number of types [types] of alcohols in the second monomer group. $c_1$ is the total proportion [mass %] of the carboxylic acids with a carbon number of 18 or less with respect to 100 mass % of the first monomer group. $c_2$ is the total proportion [mass %] of the alcohols with a carbon number of 18 or less with respect to 100 mass % of the second monomer group. $d_1$ is the proportion [mass %] of the carboxylic acid with a carbon number of $C_n$ with respect to 100 mass % of the first monomer group. $d_2$ is the proportion

[mass %] of the alcohol with a carbon number of $C_m$ with respect to 100 mass % of the second monomer group.

Developers according to various examples will be described.

With respect to 100 parts by mass of ferrite carrier, 8.5 parts by mass of each of the toners of the respective Examples was stirred using a Turbula mixer, whereby developers of the respective Examples were obtained. The surface of the ferrite carrier is coated with a silicone resin having an average particle diameter of 40 μm.

A method for evaluating the storage stability will be described.

Each of the toners of the respective Examples was left at 55° C. for 10 hours. 15 g of each of the toners of the respective Examples after being left at 55° C. for 10 hours was sieved through a mesh, and the toner remaining on the mesh was weighed. The amount of the toner remaining on the mesh is preferably as small as possible. When the amount of the toner remaining on the mesh was 3 g or less, the storage stability of the toner was evaluated as pass (good). When the amount of the toner remaining on the mesh was more than 3 g, the storage stability of the toner was evaluated as fail (bad).

A method for evaluating the heat resistance will be described.

Each of the developers of the respective Examples was stored in a toner cartridge. The toner cartridge was placed in an image forming apparatus for evaluating the heat resistance. The image forming apparatus for evaluating the heat resistance is an apparatus obtained by attaching a thermocouple to a developing device of commercially available e-studio 6530c (manufactured by Toshiba Tec Corporation). By using the image forming apparatus for evaluating the heat resistance, an original document with a printing ratio of 4.0% was continuously copied on A4 size paper. Whether or not conveyance failure or a defective image occurred was confirmed every time the temperature in the developing device was raised by 2° C. while copying, and the temperature at which conveyance failure or a defective image started to occur was recorded. When the temperature at which conveyance failure or a defective image started to occur was 47° C. or higher, the heat resistance of the toner was evaluated as pass (good). When the temperature at which conveyance failure or a defective image started to occur was lower than 45° C., the heat resistance of the toner was evaluated as fail (bad).

A method for evaluating the low-temperature fixability will be described.

Each of the developers of the respective Examples was stored in a toner cartridge. The toner cartridge was placed in an image forming apparatus for evaluating the low-temperature fixability. The image forming apparatus for evaluating the low-temperature fixability is an apparatus obtained by modifying commercially available e-studio 6530c (manufactured by Toshiba Tec Corporation) so that the fixing temperature can be set by changing the temperature by 0.1° C. at a time between 100° C. and 200° C. By using the image forming apparatus for evaluating the low-temperature fixability and setting the fixing temperature to 150° C., 10 sheets of a solid image at a toner adhesion amount of 1.5 mg/cm² were obtained. When image peeling due to offset or unfixing did not occur on all the 10 sheets of a solid image, the set temperature was decreased by 1° C., and a solid image was obtained in the same manner as described above. This operation was repeated, and the lower limit temperature of the fixing temperature at which image peeling did not occur on the solid image was determined, and the lower limit temperature was defined as the lowest fixing temperature of the toner. When the lowest fixing temperature was 120° C. or lower, the low-temperature fixability of the toner was evaluated as pass (good). When the lowest fixing temperature was higher than 120° C., the low-temperature fixability of the toner was evaluated as fail (bad).

A method for evaluating the electric charge amount will be described.

By using commercially available e-studio 5005AC (manufactured by Toshiba Tec Corporation), an original document with a printing ratio of 8.0% was continuously copied on 200,000 sheets of A4 size paper. Thereafter, the toner deposited below a magnet roller of a developing device was sucked with a vacuum cleaner, and the amount of the deposited toner was measured as the amount of the contaminant toner. When the amount of the contaminant toner was 170 mg or less, the electric charge amount of the toner was evaluated as pass (good) When the amount of the contaminant toner was more than 170 mg, the electric charge amount of the toner was evaluated as fail (bad).

Figure 3:
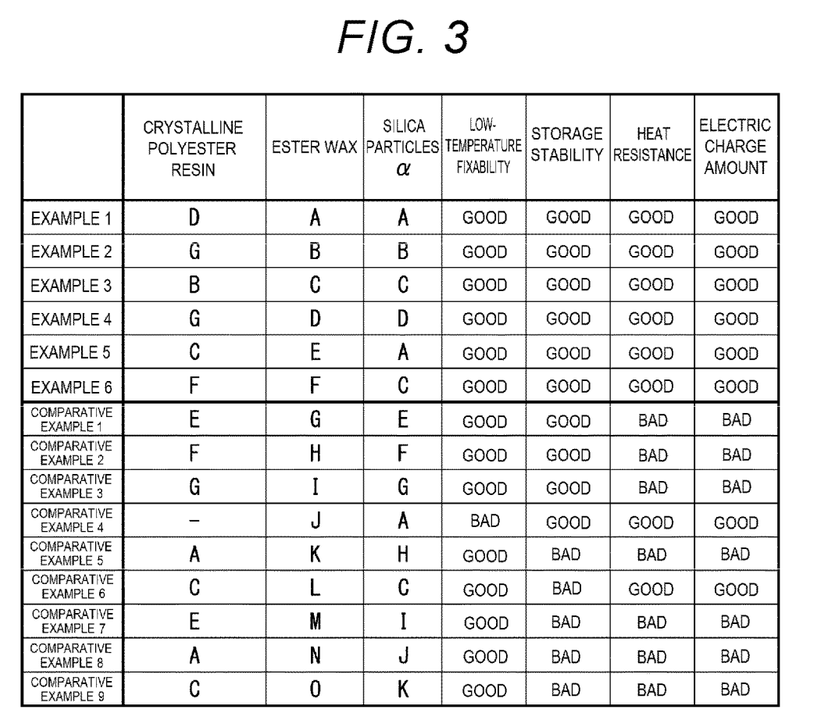
FIG. 3 shows measurement results and evaluation results for Examples according to at least one embodiment.

The evaluation results of the low-temperature fixability, storage stability, heat resistance, and electric charge amount of each of the toners of the respective Examples are shown in FIG. 3.

The toners of Examples 1 to 6 had excellent low-temperature fixability, storage stability, and heat resistance. Further, the amount of the contaminant toner was small, and the electric charge amount could be sufficiently maintained even under high temperature and high humidity in the image forming apparatus.

On the other hand, the toners of Comparative Examples 1 to 9 did not simultaneously meet the pass criteria for all the low-temperature fixability, storage stability, heat resistance, and electric charge amount.

Subsequently, the relationship between the moisture amount of the silica particles and the electric charge amount of the toner was measured. Toner samples in which the moisture amount of the silica particles was changed in advance were prepared. 100 g of a developer containing each of the toner samples was left to stand overnight (at least 8 hours or more) in an environment of 30° C. and 85% in a plastic bottle. Thereafter, the plastic bottle was stirred using a Turbula mixer for 5 minutes, and the electric charge amount was measured using a suction-type blow-off device immediately after stirring.

Figure 4:
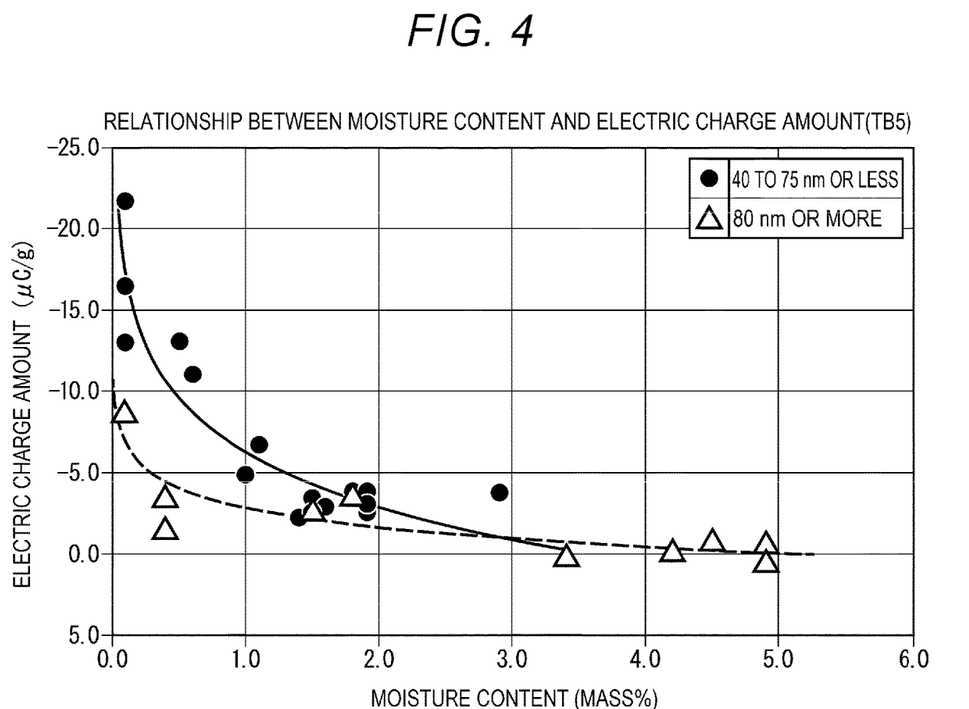
FIG. 4 shows measurement results for the relationship between the moisture content of silica particles and the electric charge amount of a toner according to at least one embodiment.

FIG. 4 shows the measurement results for the relationship between the moisture content of the silica particles and the electric charge amount of the toner. As shown in FIG. 4, when the moisture content of the silica particles is within a range of less than 1.0 mass %, the electric charge amount of the toner using the silica particles having a $D_{50}$ of 40 to 75 nm is larger than the electric charge amount of the toner using the silica particles having a $D_{50}$ of 80 nm or more. In this manner, it is found that when the $D_{50}$ of the silica particles contained in the external additive is between 40 and 75 nm and the moisture content of the silica particles is less than 1.0 mass %, the electric charge amount of the toner is maintained.

While certain embodiments of the disclosure have been described, these embodiments have been presented by way of example only, and are not intended to limit the scope of the disclosure. The novel embodiments described herein may be embodied in various other forms, and various omissions, substitutions, and changes may be made without departing from the gist of the invention. The embodiments and modifications thereof are included in the scope and gist of the disclosure and also included in the invention described in the claims and in the scope of their equivalents.

What is claimed is:

1. A toner comprising:
toner base particles; and
an external additive attached to surfaces of the toner base particles, wherein
the toner base particles contain a crystalline polyester resin and an ester wax,
the proportion of an ester compound with a carbon number of $C_1$, the content of the ester compound with a carbon number of $C_1$ being highest among ester compounds constituting the ester wax, is 65 mass % or more with respect to 100 mass % of the ester wax,
the carbon number distribution of the ester wax has only one maximum peak in a region where the carbon number is 43 or more,
the external additive contains silica particles having a volume average primary particle diameter $D_{50}$ of 40 nm to 75 nm,
the moisture content of the silica particles is less than 1.0 mass % with respect to 100 mass % of the silica particles, and
the ester wax is a condensation polymer of a first monomer group composed of at least three or more types of carboxylic acids and a second monomer group composed of at least two or more types of alcohols.

2. The toner according to claim 1, wherein the external additive further comprises either one or both of strontium titanate or titanium oxide.

3. The toner according to claim 1, wherein the toner base particles further comprise colorant.

4. The toner according to claim 1, wherein the content of the external additive is between 2 and 15 parts by mass with respect to 100 parts by mass of the toner base particles.

5. The toner according to claim 4, wherein the content of the external additive is between 4 and 10 parts by mass with respect to 100 parts by mass of the toner base particles.

6. The toner according to claim 5, wherein the content of the external additive is between 4 and 8 parts by mass with respect to 100 parts by mass of the toner base particles.

7. The toner according to claim 1, wherein
the proportion of a carboxylic acid with a carbon number of $C_n$, the content of which is highest in the first monomer group, is between 70 and 95 mass % with respect to 100 mass % of the first monomer group, and
the proportion of an alcohol with a carbon number of $C_m$, the content of which is highest in the second monomer group, is between 70 and 90 mass % with respect to 100 mass % of the second monomer group.

8. The toner according to claim 1, wherein
the proportion of a carboxylic acid with a carbon number of 18 or less in the first monomer group is 5 mass % or less with respect to 100 mass % of the first monomer group.

9. The toner according to claim 1, wherein
the proportion of an alcohol with a carbon number of 18 or less in the second monomer group is 20 mass % or less with respect to 100 mass % of the second monomer group.

10. A toner cartridge, in which the toner according to claim 1 is stored.

11. An image forming apparatus, in which the toner according to claim 1 is stored.

12. The toner according to claim 1, wherein the moisture content of the silica particles is less than 0.7 mass % with respect to 100 mass % of the silica particles.

13. The toner according to claim 12, wherein the moisture content of the silica particles is less than 0.3 mass % with respect to 100 mass % of the silica particles.

14. The toner according to claim 1, wherein the external additive contains silica particles having a volume average primary particle diameter $D_{50}$ of 40 nm to 70 nm.

15. The toner according to claim 5, wherein the external additive contains silica particles having a volume average primary particle diameter $D_{50}$ of 40 to 60 nm.

16. The toner according to claim 1, wherein the carbon number distribution of the ester wax has only one maximum peak in a region where the carbon number is 43-56.

17. The toner according to claim 16, wherein the carbon number distribution of the ester wax has only one maximum peak in a region where the carbon number is 44-46.

18. The toner according to claim 1, wherein a mass average molecular weight of the crystalline polyester resin is between $6 \times 10^3$ and $18 \times 10^3$.

19. The toner according to claim 18, wherein a mass average molecular weight of the crystalline polyester resin is between $8 \times 10^3$ and $14 \times 10^3$.

* * * * *